(No Model.)
B. JAMES.
FILTER.
No. 332,610. Patented Dec. 15, 1885.
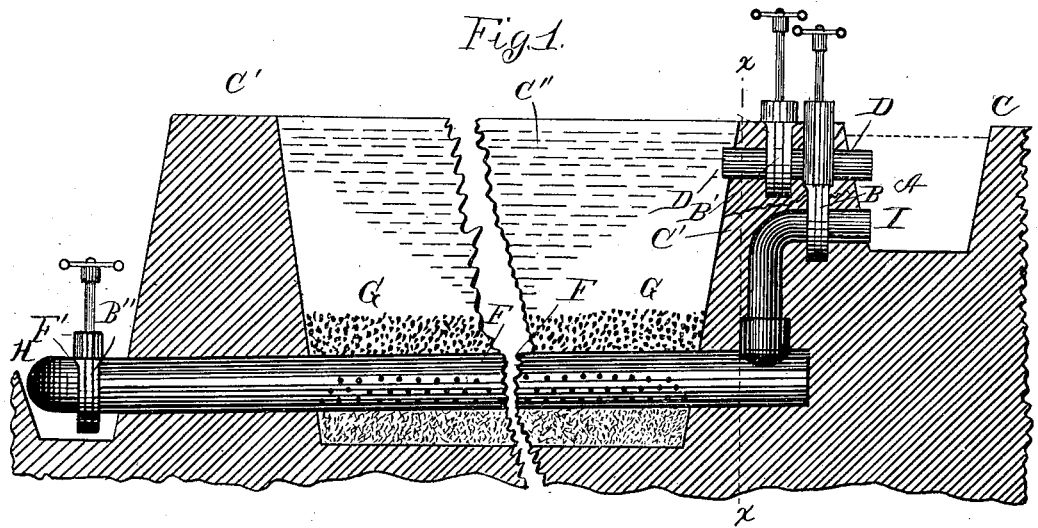
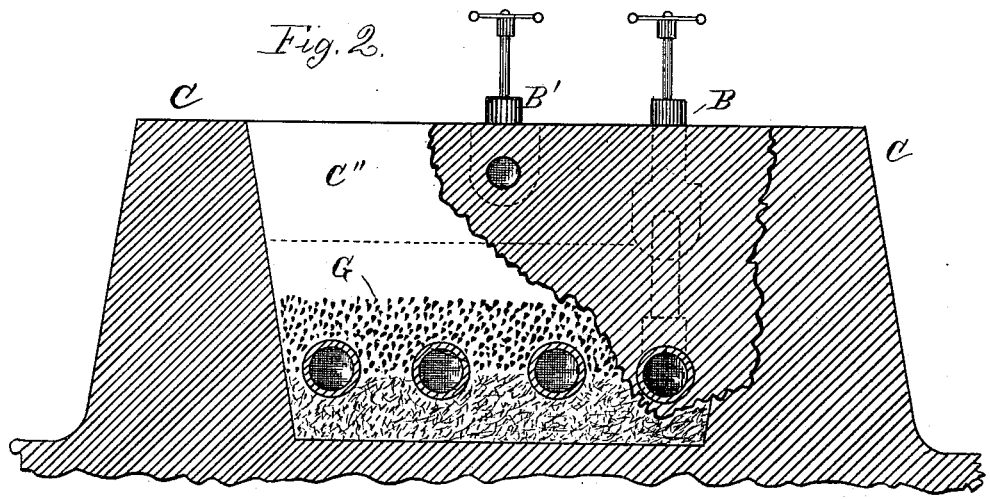
Witnesses
John C. Miller
A. L. Kayser
Benjamin James
Inventor
W. F. Fitzgerald
Attorney

UNITED STATES PATENT OFFICE.

BENJAMIN JAMES, OF WORCESTER, MASSACHUSETTS, ASSIGNOR TO WALTER B. JAMES, OF SAME PLACE.

FILTER.

SPECIFICATION forming part of Letters Patent No. 332,610, dated December 15, 1885.

Application filed April 29, 1884. Serial No. 129,787. (No model.)

*To all whom it may concern:*

Be it known that I, BENJAMIN JAMES, a citizen of the United States, residing at Worcester, in the county of Worcester and State of Massachusetts, have invented certain new and useful Improvements in Filtering Sewer-Water from Cities, Manufactories, &c.; and I do hereby declare the following to be a full, clear, and exact description of the invention, such as will enable others skilled in the art to which it appertains to make and use the same.

The object of this improvement is an efficient mode and means of filtering sewer-water from cities, towns, villages, manufactories, and shops. This result is attained in the mechanism illustrated in the drawings herewith filed as part hereof, in which the same letters of reference denote the same parts in all the views.

Figure 1 is a sectional view illustrating my improvement and the practical application thereof. Fig. 2 is a transverse sectional view taken on the line $x\ x$ of Fig. 1, and showing a modification in the construction or application of the improvement.

A represents a sewer, ditch, or canal, for which a pipe may be substituted, in which sewerage flows, and which is provided with suitable outlets or gates, B B'.

C C' are banks of earth or walls of masonry, forming a basin, C'', to hold water, for which a wooden reservoir may be substituted, and which is to be of such length and height as may be required for the purpose.

D is a water-way, either round or square, and provided with a gate, as aforesaid, of any suitable construction for controlling the flow of liquid sewerage into the filter-basin.

F represents perforated pipes or their equivalents at the bottom of the filter-basin, and covered with a suitable quantity of gravel or sand, or other proper material for the purpose. The pipes F F may be increased in number, length, or size, as may be required. The pipes are provided with a series of perforations half-way around the bodies thereof, and are to be laid with the perforated sides down, to prevent the sand or sediment from settling in the perforations and filling them up or falling through and washing out. Another advantage of this construction and arrangement is, that the water will be continually working up through the perforations, and the accumulation of sediment in and the filling up of the pipes will thus be prevented.

G represents gravel and sand screened and washed free of loam, and placed around and over the pipes F, for the purpose of filtering.

F' is a raceway to convey the filtered water back to the river or brook.

H is the low ground beyond and below the filter, which is to be placed as described.

I is a supply-pipe, from the canal A to the filter-pipes F, for the purpose hereinafter shown.

The mode of operation is as follows: When the canal is full, and at a time when there is the least sediment in the water, gate B is opened, and sufficient water is let in to cover the gravel, after which gate B is closed and gate B' is opened, and allowed to remain so, and when the basin is full the gate B'' is opened and left so, and when the filtered water flows out slowly, in consequence of the accumulated sediment in the pipes and basin, gate B' should be closed; and when the basin is almost empty gate B'' is to be closed and gate B opened, which will let the water in the back way and up through the gravel and sand. The sediment in the perforations in the pipes will thus be washed out so the water will run freely. Gate B is then closed and B' B'' opened, and the water let run as long as it will.

When, by reason of the accumulation of too much sediment, the water runs too slowly, close gate B' and drain the basin entirely, clean out the sediment with suitable implements, and repeat.

Several filtering and basin pipes may be provided, as shown in Fig. 2, in which case some can be put in operation while the obstructed pipes and basins are being cleaned out, and fresh gravel and sand placed around them when needed.

Having explained the construction and operation of my improvement, what I claim as new, and desire to secure by Letters Patent, is—

The perforated drain-pipe, in combination with the canal, supply-pipe provided with a controlling-gate, the filtering-basin provided with suitable filtering material, and filtering-pipe having gate, substantially as specified, and for the purpose set forth.

In testimony whereof I affix my signature in presence of two witnesses.

BENJAMIN JAMES.

Witnesses:
JOHN R. THAYER,
FLORENCE D. SCOTT.